G. A. BRIDGE.
DIFFERENTIAL POWER TRANSMISSION GEARING FOR AUTOMOTIVE VEHICLES.
APPLICATION FILED MAR. 9, 1922.
1,437,715.
Patented Dec. 5, 1922.
2 SHEETS—SHEET 1.
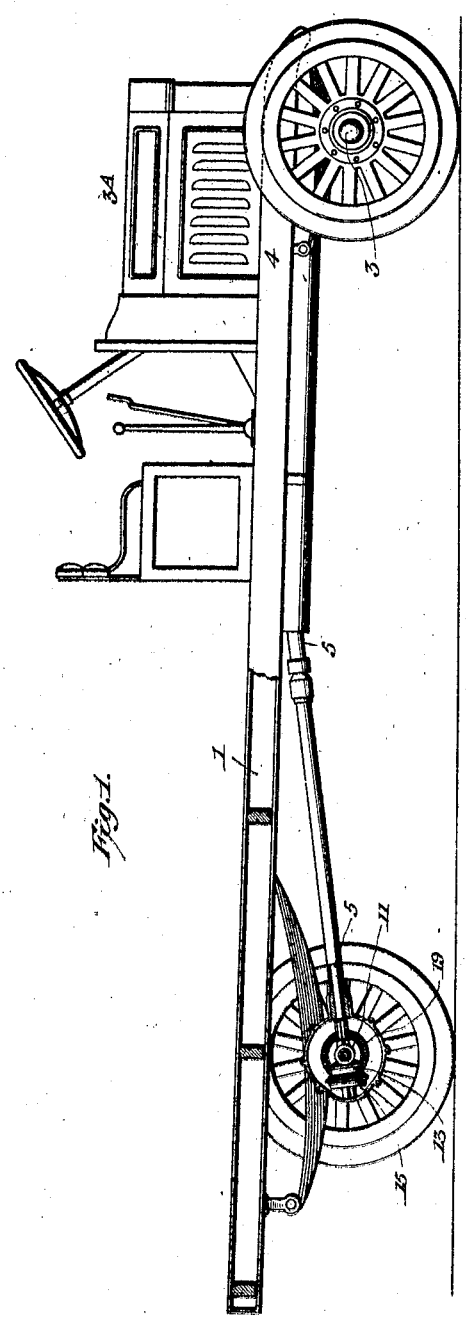
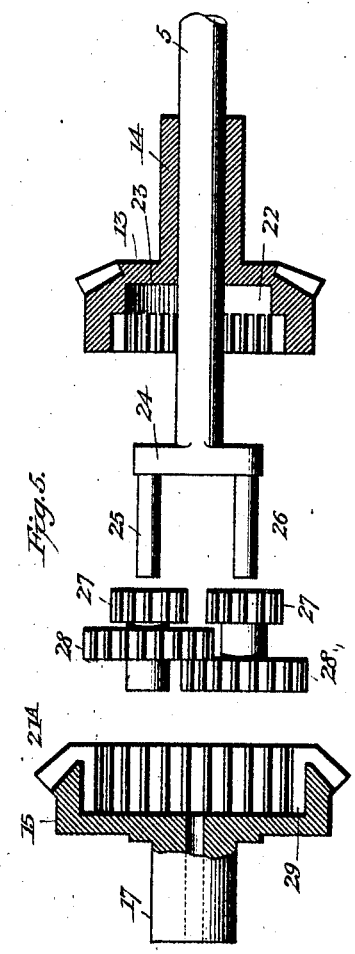
Inventor
George A. Bridge
By
H. S. Bailey
Attorney

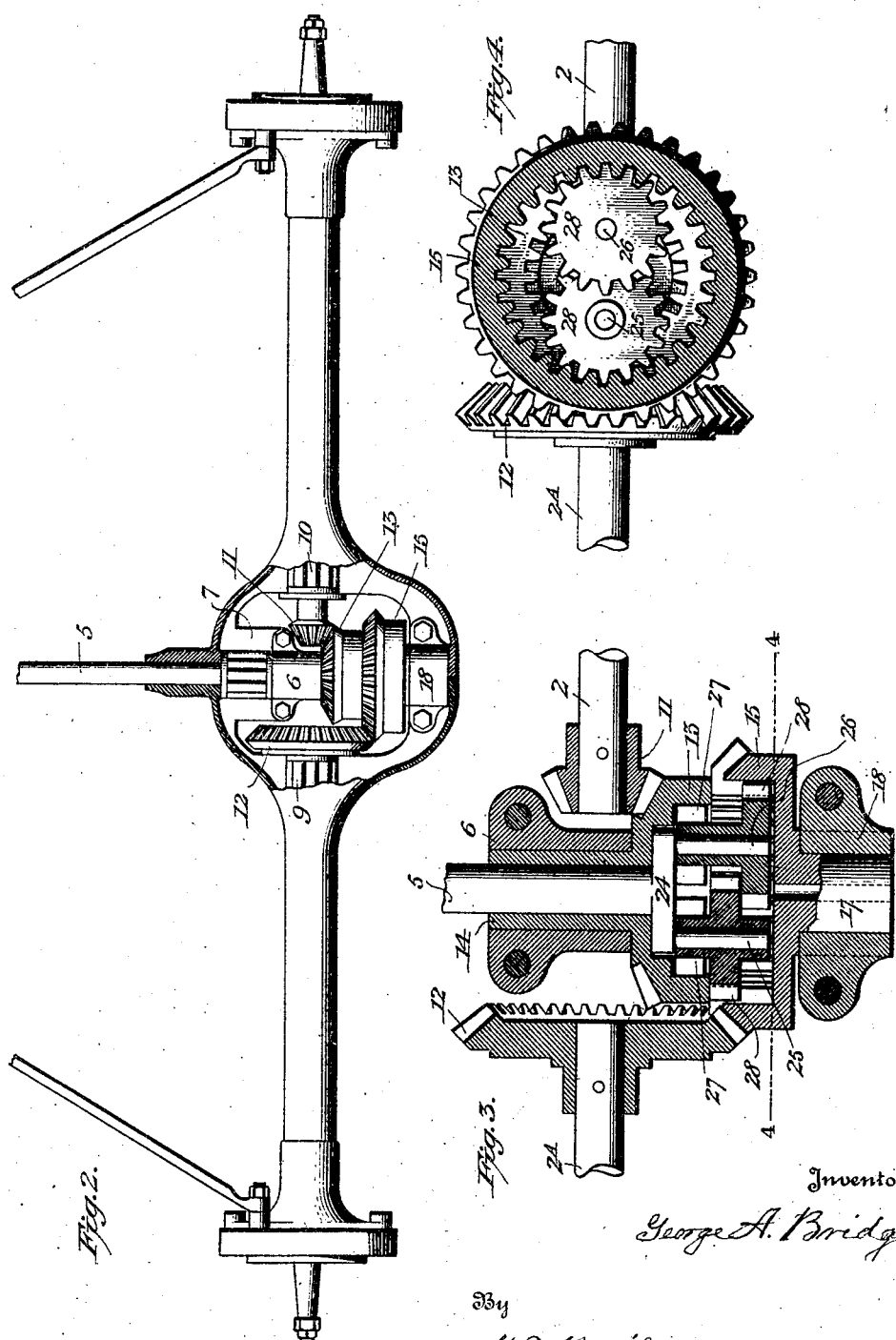

Patented Dec. 5, 1922.

1,437,715

UNITED STATES PATENT OFFICE.

GEORGE A. BRIDGE, OF ENGLEWOOD, COLORADO.

DIFFERENTIAL POWER-TRANSMISSION GEARING FOR AUTOMOTIVE VEHICLES.

Application filed March 9, 1922. Serial No. 542,409.

*To all whom it may concern:*

Be it known that I, GEORGE A. BRIDGE, a citizen of the United States of America, residing at Englewood, county of Arapahoe, and State of Colorado, have invented a new and useful Differential Power-Transmission Gearing for Automotive Vehicles, of which the following is a specification.

My invention relates to a new type of differential power transmission gearing for automotive trucks, automobiles, and other power operated vehicles, and the objects of my invention are:

First. To provide a power transmitting differential speed mechanism that is free from equalizing intermediate members and that does not exert side thrusts on the axles, their gears, and on their supporting journal boxes.

Second. To provide a differential speed and power transmission gearing that is connected to an axle member that is divided into two independently driven parts that are driven in unison and at the same speed, or in which one axle rotates and the other is substantially stationary, or entirely dependent of the movement of the other.

Third. To provide a simple, powerful and practical power transmission gearing for automotive trucks, that can be applied to both the rear and front axle members of trucks, and that will drive all four wheels.

I attain these objects by the mechanism illustrated in the accompanying drawings, in which:

Figure 1 is a side view, partly in section, showing a truck provided with my improved differential power transmission gearing.

Fig. 2 is a plan view of the rear axle housing, partly broken away to show the improved gearing in connection with the divided axle.

Fig. 3 is an enlarged horizontal sectional view of the improved differential power transmission gearing.

Fig. 4 is a sectional view on the line 4—4 of Figure 3.

Fig. 5 is a sectional view showing one end portion of the driving shaft and gearing mounted thereon, together with one of the gears operated by said gearing, and which is in axial line with the driving shaft.

Similar letters of reference refer to similar parts throughout the several views.

Referring to the drawings:

The numeral 1 designated the frame portion of an automotive truck. The rear axle member of my truck driving transmission is divided into two independent axles 2 and 2A, which are arranged in alinement with each other.

3 designates the front axle in Figure 1, but in case my transmission axle driving mechanism is applied to the front axle, it is divided into two axle portions, the same as the rear axle.

The numeral 3A designates the motor of the truck, which is mounted on the front end 4 of the frame 1.

In the center of the width of the frame 1 and along its length from its motor 3A, I extend a shaft 5, which is the rear axles' and the rear wheels' driving shaft, and which could be, if desired, connected to my transmission gearing so as to drive the front wheels of the truck also, as will be fully explained hereinafter. The driving shaft 5 is rotatably mounted longitudinally and centrally on the frame in suitable journal boxes, which are secured to the frame 1, and at its front end it is secured by any suitable means to the crank shaft of the motor 3A.

The opposite end of the driving shaft 5 extends through and is rotatably journaled in the journal box 6 that is mounted on and secured to a plate 7 that is secured in the rear axle housing 8.

The two axle members 2 and 2A are rotatably mounted in suitable journal boxes 9 and 10, that are secured in the housing 8, and on the inner end of the axle 2 a small bevel pinion 11 is secured, and on the inner end of the axle 2A a bevel gear 12 is secured, that is enough larger than the bevel pinion 11 to allow its axle 2A to be driven at the same speed as the axle 2 is driven by the intermediate members of my power transmitting gearing, which are as follows:

Upon the driving shaft 5, a bevel gear 13 is mounted, having a hub 14 which is journaled in the box 6, and a second bevel gear 15 adjoins the gear 13 and has a trunnion 17, which is mounted in a bearing 18 on the plate 7, in axial line with the journal box 6; I term the gears 13 and 15, differential gears. The differential bevel gear 13 is loosely mounted on the driving shaft 5 at the side of the journal box 6, and it is provided with a long hub 14, that extends rotatably into the journal box 6, and consequently the gear 13 is journaled rotatably on the shaft and in the journal box 6, and the bevel gear teeth of this gear 13 mesh with the bevel pinion 11. The differential bevel gear 15 is not mounted on the shaft 5, but it is placed at the side of the journal box 18 and close to the gear 13, and it is provided with the long hub portion 17 that extends into and is rotatably mounted in the journal box 18, which is positioned so that the axial center of the gear 15 and its hub 17 is in axial alinement with the axial center of the driving shaft 5, and its bevel gear teeth mesh with the bevel gear 12 on the shaft 2$^A$.

The bevel gear 13 is provided with a concentric recess 22 that extends into the opposite side of it from its hub 14 provided side, and the end of the driving shaft that extends into this bevel gear terminates at the bottom wall 23 of this recess 22, and a cross bar 24 is formed on the end of the driving shaft, the inner side of which bears and rotates against the wall 23. The opposite ends of this cross bar are provided with two projecting pins 25 and 26, which are positioned at equal distances from the axial center of the driving shaft 5, and extend from the cross bar parallel with the longitudinal axis of the driving shaft. Upon these pins 25 and 26 I mount loosely an integrally connected spur toothed pinion 27 and a spur toothed gear 28. Consequently each pin supports a spur tooth pinion and gear. They are of the same size on each pin, and the spur tooth portion 27 on both pins, meshes into a circumferential row of gear teeth which forms an internal gear in the inner peripheral wall of the recess 22 of the bevel gear 13, while the spur toothed gears 28 of both pins, with the terminal ends of the pins, project into a concentric recess 29 that is formed in the adjacent side of the bevel gear 15, and these spur toothed gears 28 mesh with similar gear teeth that are formed in the inner peripheral wall of the recess 29, which form an internal gear within the bevel gear 15, and I call these spur tooth pinions and gears, with their encircling gear teeth, internal gears within the differential gears 13 and 15.

The spur gear teeth of the bevel gear 15 are formed to connect with and join evenly with the inner ends of the beveled gear teeth 21$^A$ of the said bevel gear 15, and thus, although of a different form of gear teeth, they are a continuous part of them. The hub 17 of the bevel gear 15 is provided with an axial aperture that extends entirely through it to the outside of the journal box 18, through which oil or grease may be forced into the recesses of the bevel gears 13 and 15, and the four spur gears within them.

The relative proportional sizes of the bevel pinion 11 and its intermeshing bevel gear 13 with its pinion spur gears 27, to the spur toothed gears 28 and the beveled gear 15, and the bevel gear 12, are such that when the driving shaft 5 is rotated by the motor, both of the axle parts 2 and 2$^A$ rotate in unison, and at exactly the same rotative speed and with the application of an equal amount of power to each of them. As they are at an equal distance from the center of the shaft, the pins 25 and 26 act as a spanner wrench at the end of the driving shaft, and impart an equal amount of power on their pinions, and thus to the two bevel gears 13 and 15, and thus a very simple and direct rotative force is applied to the bevel pinion 11 and its axle 2 and the bevel gear 19 and its axle 2$^A$, without any side thrust on these gears or their axles and wheels, while no complicated intermediate mechanism is employed to transmit the power from the driving shaft to the divided parts of the axle.

The operation of my power transmission gearing machanism is as follows:

When the driving shaft 5 is rotated by the motor, it rotates in the hub 14 of the bevel gear 13, and its cross bar and pins rotate in the recess of this gear, and the pinion spur gears 27 on them rotate the bevel gear 13, which rotates the bevel pinion 11 on the axle 2, and at the same time the spur gears 28 on the pins 25 and 26 rotate the bevel gear 15, and it, in turn, rotates the bevel gear 19 on the axle 2$^A$.

While my differential power transmitting gearing can be applied to the driving shaft to drive the front wheels of the truck, I do not illustrate its application to them in this application, as it would tend to confuse and complicate the simple application of it to the rear axle, where transmission gearing is universally applied to all trucks.

My invention provides a very simple, cheaply constructed, easily assembled and powerful differential power gearing for trucks and other automotive vehicles, and while I have illustrated and described the preferred construction and arrangement of my invention, I do not wish to be limited to it, as changes may be made in it without departing from the spirit of my invention.

Having described my invention, what I claim as new and desire to secure by Letters Patent, is:

1. In mechanism of the character described, the combination with a divided axle having bevel gears on its opposing ends; of a driving shaft having a bevel driving gear loosely mounted thereon and in mesh with one of the axle gears, said driving gear being internally toothed, a second bevel driving gear in axial line with the first driving gear and adjoining the same, said second driving gear being in mesh with the other axle gear, and being internally toothed, parallel trunnions on the end of the driving shaft, and a gear on each trunnion having portions in mesh with the internal teeth of the said first and second driving gears.

2. In mechanism of the character described, the combination with a divided axle having bevel gears on its opposing ends; of a power driven shaft having a bevel driving gear loosely mounted thereon and in mesh with one of the axle gears, said gear being internally toothed, a second bevel driving gear in axial line with the first driving gear and adjoining the same, said second driving gear being in mesh with the other axle gear, and being internally toothed, said power driven shaft terminating in parallel trunnions, two integrally connected gears of different diameters mounted on each trunnion, the gears of less diameter being in mesh with the internal teeth of the first driving gear, while the gears of greater diameter mesh with the internal teeth of the second driving gear.

3. In mechanism of the character described, the combination with a divided axle, having bevel gears on its opposing ends; of a power driven shaft, a bevel driving gear having a hub which is loosely mounted on said shaft, and a bearing for said hub, said driving gear being in mesh with one of said axle gears, and being internally toothed, a second bevel driving gear in axial line with and adjoining the first driving gear, and in mesh with the other axle gear, said second driving gear being internally toothed and provided with a projecting trunnion, and a bearing for said trunnion, a cross head on the inner end of the power driven shaft and rotatable within the first driving gear, parallel trunnions on said cross head, two integrally connected gears of different diameters mounted on each of said trunnions, the gears of less diameter being in mesh with the internal teeth of the first driving gear, while the gears of greater diameter mesh with the internal teeth of the second driving gear.

In testimony whereof I affix my signature in presence of two witnesses.

GEORGE A. BRIDGE.

Witnesses:
G. SARGENT ELLIOTT,
ELIZABETH SMITH.